US010153828B2

(12) United States Patent
Yi et al.

(10) Patent No.: US 10,153,828 B2
(45) Date of Patent: Dec. 11, 2018

(54) SYSTEM AND METHOD FOR AVOIDING MOBILE RELAY INTERFERENCE TO PRIMARY SYSTEM ON AUTHORIZED FREQUENCY SPECTRUM

(71) Applicant: SHANGHAI RESEARCH CENTER FOR WIRELESS COMMUNICATIONS, Shanghai (CN)

(72) Inventors: Huiyue Yi, Shanghai (CN); Rui Wang, Shanghai (CN); Honglin Hu, Shanghai (CN); Haitao Li, Beijing (CN); Kodo Shu, Beijing (CN)

(73) Assignee: SHANGHAI RESEARCH CENTER FOR WIRELESS COMMUNICATIONS, Shanghai (CN)

( * ) Notice: Subject to any disclaimer, the term of this patent is extended or adjusted under 35 U.S.C. 154(b) by 174 days.

(21) Appl. No.: 14/899,495

(22) PCT Filed: Jun. 25, 2014

(86) PCT No.: PCT/CN2014/080671
§ 371 (c)(1),
(2) Date: Dec. 17, 2015

(87) PCT Pub. No.: WO2014/206282
PCT Pub. Date: Dec. 31, 2014

(65) Prior Publication Data
US 2016/0182139 A1  Jun. 23, 2016

(30) Foreign Application Priority Data

Jun. 26, 2013 (CN) .......................... 2013 1 0258222

(51) Int. Cl.
*H04B 7/155* (2006.01)
*H04W 16/14* (2009.01)

(52) U.S. Cl.
CPC ........ *H04B 7/15564* (2013.01); *H04W 16/14* (2013.01)

(58) Field of Classification Search
CPC ........................ H04B 7/155564; H04W 16/14
(Continued)

(56) References Cited

U.S. PATENT DOCUMENTS

2006/0003760 A1* 1/2006 Li ........................ H04B 7/155
455/424
2010/0105419 A1* 4/2010 Kim ...................... H04W 72/02
455/509

(Continued)

FOREIGN PATENT DOCUMENTS

| CN | 102083191 | 6/2011 |
| CN | 102355738 | 5/2012 |
| CN | 102857972 | 1/2013 |

*Primary Examiner* — Raj Chakraborty
(74) *Attorney, Agent, or Firm* — Kirton McConkie; Evan R. Witt

(57) ABSTRACT

The present invention provides a system and method for avoiding mobile relay interference to a primary system on an authorized frequency spectrum. In accordance with the system, and with an available-spectrum information provision unit which communicates with the primary system, determine, in accordance with operation information coming from said primary system, authorized-spectrum available-spectrum information capable of being used by a mobile relay when said mobile relay is located in various positional regions surrounding the primary system, and provide the available-spectrum information corresponding to each positional region to a secondary system; using the secondary system and based on the available-spectrum information corresponding to the various positional regions, determine at least one of the positional regions of the primary system, which is experiencing interference from a mobile relay located within the range of base station coverage within the (Continued)

secondary system, and provide each determined positional region to each mobile relay.

13 Claims, 2 Drawing Sheets

(58) Field of Classification Search
USPC .......................................................... 455/11.1
See application file for complete search history.

(56) References Cited

U.S. PATENT DOCUMENTS

| | | | |
|---|---|---|---|
| 2010/0182916 A1* | 7/2010 | Drewes | H04B 7/15521 370/252 |
| 2011/0158295 A1* | 6/2011 | Shiizaki | H04B 7/155 375/211 |
| 2013/0065511 A1 | 3/2013 | Wu | |
| 2013/0072192 A1* | 3/2013 | Xu | H04W 16/02 455/436 |
| 2013/0102319 A1* | 4/2013 | Yamazaki | H04W 52/243 455/450 |
| 2013/0286930 A1* | 10/2013 | Nagata | H04B 7/15542 370/315 |
| 2014/0120940 A1 | 5/2014 | Ren | |

* cited by examiner

SYSTEM AND METHOD FOR AVOIDING MOBILE RELAY INTERFERENCE TO PRIMARY SYSTEM ON AUTHORIZED FREQUENCY SPECTRUM

BACKGROUND

Technical Field

The present invention relates to a system and method for avoiding mobile relay interference to a primary system on an authorized frequency spectrum.

Related Art

With development of mobile networks, carrier spectrums of existing mobile networks not only carry voice, short message and other traditional mobile services, but also are responsible for transmitting a large amount of data on the Internet, which causes carrier spectrum resources of the mobile networks to become more and more scarce, and in order to alleviate the spectrum resources of the mobile networks, transmitting mobile services by using the existing spectrums has become a hotspot. A cognitive radio (CR) technology can greatly increase spectrum utilization by allowing unauthorized users to have the chance to use spectrum resources of a primary system. In order to solve spectrum resource shortage problems of LTE systems and some problems of low spectrum utilization of other authorized frequency bands, the prior art puts forward a spectrum authorization scheme, and the scheme is called "authorized shared access" (ASA). The ASA scheme is based on authorization models of spectrum rights, to allow a secondary LTE system to use the CR technology (geographic location database, cognition and so on) to share spectrum resources with the existing primary system.

Therefore, in order to be capable of achieving resource sharing and noninterference of authorized frequency spectrums, a base station near the primary system must satisfy: the range covered by the base station must have no intersection with the range protected during transmission of the primary system, meanwhile, in order to ensure that a mobile relay within the coverage range of the base station does not interfere with operation of the primary system, it is required that a carrier frequency used by the mobile relay cannot interfere with normal operation of the primary system. The manner of making the mobile relay not interfere with the primary system is generally as follows: changing transmitting power of the mobile relay or changing a frequency used by the mobile relay. However, as the primary system does not transmit a signal at a fixed frequency during operation and the mobile relay may cause harmful interference to the primary system due to a change of its position, how to real-time change maximum transmitting power or carrier frequency of the mobile relay according to transmitting power of the primary system and the geographic position of the mobile relay to avoid harmful interference to the primary system is a problem to be solved by persons skilled in the art.

SUMMARY

In view of the shortcomings of the prior art, an object of the present invention is to provide a system and method for avoiding mobile relay interference to a primary system on an authorized frequency spectrum, used to solve the problem in the prior art that interference may be caused to the existing primary system when the mobile relay uses an authorized frequency spectrum of the primary system.

To achieve the foregoing object and other related object, the present invention provides a system for avoiding mobile relay interference to a primary system on an authorized frequency spectrum, wherein the system comprises: an available-spectrum information provision device which communicates with the primary system of the authorized frequency spectrum, used to determine, based on operation information from the primary system, available-spectrum information of the authorized frequency spectrums that can be used in different positional regions surrounding the primary system, wherein each of the positional region corresponds to at least one group of the available-spectrum information; and a secondary system which communicates with the available-spectrum information provision device, comprising: a base station; and an interference position determination memory, used to determine, based on the available-spectrum information corresponding to different positional regions provided by the available-spectrum information provision device, at least one of the positional regions of the primary system which is being interfered by a mobile relay located within a coverage range of the base station, so that the base station could provide the determined positional regions for each mobile relay within the coverage range; and the mobile relay located within the coverage range of the base station, used to, when moving into the positional region determined by the interference position determination memory, provide to the base station information containing the positional region where the mobile relay is located, so that the base station could adjust the mobile relay based on the at least one group of available-spectrum information corresponding to the positional region.

Preferably, the available-spectrum information includes: a carrier frequency within an authorized frequency spectrum that can be used in the positional region, maximum allowable transmitting power on the carrier frequency in the positional region, and an available period of the carrier frequency allowed in the positional region.

Preferably, the available-spectrum information provision device includes: a processor executing computer-executable instructions to divide, based on a preset step, a region outside a protection border of the primary system into multiple positional regions, and compute available-spectrum information used when interference to operation of the primary system is avoided according to a distance from each positional region to the protection border of the primary system and operation information of the primary system; and a storage, used to store the positional regions and the corresponding available-spectrum information correspondingly in the form of charts.

Preferably, the base station is further used to, according to current system time and a carrier frequency at which the base station communicates with another mobile relay, determine one group of available-spectrum information or re-determine one group of new available-spectrum information from the available-spectrum information corresponding to the positional region provided by the mobile relay, and feed back the determined available-spectrum information to the mobile relay, and the mobile relay communicates with users of the base station and the mobile relay according to the available-spectrum information fed back.

Preferably, an edge of a range covered by the base station and a protection border of the primary system are at a safety distance.

Based on the foregoing object, the present invention further provides a method for avoiding mobile relay interference to a primary system on an authorized frequency spectrum, applied to an interference avoiding system comprising a base station at a preset distance from the primary system on the authorized frequency spectrum, wherein the method comprises: a step for determining, based on operation information from the primary system, available-spectrum information authorized frequency spectrums that can be used in different positional regions surrounding the primary system, wherein each positional region corresponds to at least one group of available-spectrum information; a step for determining, from the available-spectrum information corresponding to different positional regions, at least one of the positional regions of the primary system which is experiencing interference from a mobile relay located within a coverage range of the base station, and providing the determined positional regions for each mobile relay within the coverage range; and a step for acquiring information containing the positional region from the mobile relay when the mobile relay moves to the determined positional region, and then adjusting the mobile relay based on the acquired at least one group of available-spectrum information corresponding to the positional region.

Preferably, the available-spectrum information includes: a carrier frequency within an authorized frequency spectrum that can be used in the positional region, maximum allowable transmitting power on the carrier frequency in the positional region, and an available period of the carrier frequency in the positional region.

Preferably, in the anti-interference method, the manner of determining, based on operation information from the primary system, available-spectrum information authorized frequency spectrums that can be used in different positional regions outside a protection border of the primary system includes: dividing, based on a preset step, a region outside the protection border of the primary system into multiple positional regions; computing a carrier frequency that can be used when interference to operation of the primary system is avoided, maximum allowable transmitting power on the carrier frequency, and an available period of the carrier frequency according to a distance from each positional region to the protection border of the primary system and operation information of the primary system; and storing the positional regions and the corresponding available-spectrum information correspondingly in the form of charts.

Preferably, in the anti-interference method, the manner of adjusting the mobile relay based on the acquired at least one group of available-spectrum information corresponding to the positional region includes: according to current system time and a carrier frequency at which the base station communicates with another mobile relay, determining one group of available-spectrum information or re-determining one group of new available-spectrum information from the available-spectrum information corresponding to the positional region provided by the mobile relay, and feeding back the determined available-spectrum information to the mobile relay, wherein the mobile relay communicates with users of the base station and the mobile relay according to the available-spectrum information fed back.

As stated above, the system and method for avoiding mobile relay interference to a primary system on an authorized frequency spectrum according to the present invention have the following beneficial effects: regions outside the protection border of the primary system are divided according to distances, and available-spectrum information of an authorized frequency spectrum used by a mobile relay is determined according to the regions, which can control the maximum transmitting power, carrier frequency, available period and the like of the mobile relay in a refined manner, meanwhile, only when the mobile relay moves to an interference region within the range covered by the base station, the mobile relay provides the positional region for the base station, and the base station adjusts the maximum transmitting power, the carrier frequency and the like of the mobile relay to certain available-spectrum information corresponding to the positional region, which can thus effectively reduce the number of times of signaling interaction between the mobile relay and the base station and reduce signaling overhead between the mobile relay and the base station.

Figure 1:
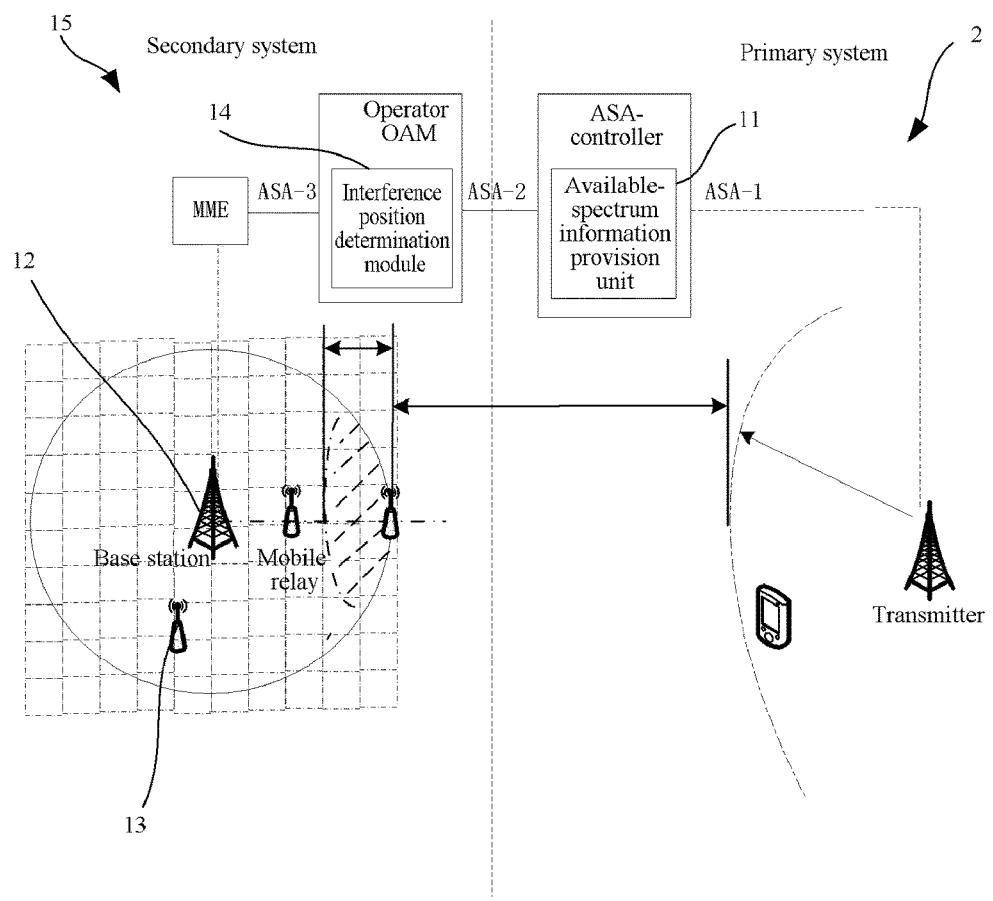
FIG. 1 is a schematic structural view of avoiding mobile relay interference to a primary system on an authorized frequency spectrum according to the present invention.

DESCRIPTION OF REFERENCE SIGNS 11 available-spectrum information provision device
12 base station
13 mobile relay
14 interference position determination memory
15 secondary system
2 primary system
S1-S3 step

DETAILED DESCRIPTION

Implementations of the present invention are described below through specific embodiments, and persons skilled in the art may understand other advantages and effects of the present invention easily from the contents disclosed in the specification. The present invention may further be implemented or applied through other different specific implementations, various details in the present invention may also be based on different opinions and applications, and various modifications or changes can be made without departing from the spirit of the present invention.

As shown in FIG. 1, the present invention provides a system for avoiding mobile relay interference to a primary system on an authorized frequency spectrum. The interference avoiding system, by detecting the position of a mobile relay, adjusts maximum transmitting power of the mobile relay within the authorized frequency spectrum and/or adjusts a carrier frequency within the authorized frequency spectrum used by the mobile relay, to avoid that the mobile relay interferes with a carrier frequency within an authorized frequency spectrum currently transmitted by the primary system. The interference avoiding system includes: an available-spectrum information provision device 11, a secondary system 15 and a mobile relay 13.

The available-spectrum information provision device 11 communicates with the primary system 2, used to determine, based on operation information from the primary system 2, available-spectrum information of an authorized frequency spectrum that the mobile relay 13 can use in different positional regions surrounding the primary system 2, wherein each positional region corresponds to at least one group of available-spectrum information. The positional region is a latticed region that takes the primary system 2 as the center. Preferably, different positional regions surrounding the primary system 2 are different positional regions outside a protection border of the primary system 2. The available-spectrum information includes, but is not limited to, a geographic coordinate of the positional region, a carrier frequency within an authorized frequency spectrum that can be used by the mobile relay in the positional region, maximum allowable transmitting power of the mobile relay in the positional region, an available period during which the mobile relay in the positional region uses the carrier frequency, and so on. The operation information includes, but is not limited to, transmitting power of a transmitter in the primary system, antenna height of the transmitter in the primary system, a protection range of the primary system, maximum acceptable interference of a primary receiver on the protection border of the primary system, and so on.

The available-spectrum information provision device 11 is an application module installed in an ASA controller that communicates with the primary system 2.

Specifically, the primary system 2 provides operation information during normal operation, such as carrier frequencies in the authorized frequency spectrum occupied, a period during which the carrier frequencies are occupied, the protection border of the primary system 2, transmitting power of a transmitter of the primary system 2, and maximum acceptable interference of a primary receiver on the protection border of the primary system 2, for the available-spectrum information provision device 11, the available-spectrum information provision device 11 uses the operation information provided by the primary system 2 to calculate within which period the mobile relay 13 in each positional region surrounding the primary system can transmit signals at a carrier frequency the same as that of the primary system 2 at how much transmitting power without interfering with users within the protection border of the primary system 2, or to calculate at which carrier frequency band in the authorized frequency spectrum selected by the mobile relay 13 within the available period will not interfere with users within the protection border of the primary system 2, or to calculate at which carrier frequency band in the authorized frequency spectrum selected by the mobile relay 13 within the available period and transmitted at how much power will not interfere with users within the protection border of the primary system 2, and so on, and after the calculation, the available-spectrum information provision device 11 can obtain at least one group of available-spectrum information corresponding to each positional region, make the obtained at least one group of available-spectrum information correspond in the corresponding positional region in the form of charts, and save the at least one group of available-spectrum information.

The standard based on which the mobile relay 13 interferes with the primary system 2 is that: a power value generated by the mobile relay 13 at the protection border of the primary system 2 is greater than a maximum acceptable interference value of the primary receiver on the protection border of the primary system.

Preferably, the available-spectrum information provision device 11 includes: a processor and a storage (not shown).

The processor is used to divide, based on a preset step, a region that takes the primary system 2 as the center into multiple positional regions, and compute available-spectrum information that can be used by a secondary device (but not limited to the mobile relay 13) when interference to operation of the primary system 2 is avoided according to a distance from each positional region to the primary system 2 and operation information of the primary system 2. The step may be, but is not limited to, 50 m.

For example, the operation information provided by the primary system 2 includes: a carrier frequency in the authorized frequency spectrum occupied being f1, a period being [a1, b1], the protection border of normal operation of the primary system 2, etc., the processor first divides a region outside the protection border into multiple positional regions according to a preset step, obtains a distance between each positional region and the protection border, uses an attenuation formula of power and distance to compute maximum transmitting power under the condition of a power value generated by the secondary device (mobile relay 13) within a certain positional region c11 is less than the maximum acceptable interference value of the primary receiver on the protection border of the primary system, and determines according to the operation information an available period [a1, b1] whose carrier frequency is f1, other available carrier frequencies f2 and f3 in the authorized frequency spectrum, corresponding available periods, etc.

The storage is used to store the positional regions and the corresponding available-spectrum information correspondingly in the form of charts.

The example in the processor is continued, the storage takes the available period [a1, b1] the maximum allowable transmitting power, and available carrier frequencies f2 and f3 corresponding to the positional region c11 as one group of available-spectrum information, takes other available carrier frequencies f1, f2 and f3, periods and maximum transmitting power corresponding to the positional region c11 as another group of available-spectrum information, and correspondingly stores the two groups of available-spectrum information in the chart of the positional region c11.

Hardware of the secondary system 15 includes: an operator OAM (operator network operation administration and maintenance module), an MME (mobility management module) connected with the operator OAM, and a base station 12 communicating with the MME. An interference position determination memory 14 is installed in the operator OAM, MME or base station. Preferably, the interference position determination memory 14 is a memory including computer program instructions of an application program in the base station 12.

The interference position determination memory 14 communicates with the available-spectrum information provision device 11, used to determine, based on the available-spectrum information corresponding to different positional regions, at least one of the positional regions of the primary system 2 which is experiencing interference from a mobile relay 13 within a coverage range, and provide the determined positional regions for each mobile relay 13 within the coverage range. A range covered by the base station 12 does not intersect with the protection border. Preferably, an edge of the range covered by the base station 12 and a protection border of the primary system 2 are at a safety distance. The safety distance refers to a distance from an edge of the range covered by the base station 12 to the protection border when power sent by the base station 12 to the protection border is less than the maximum acceptable interference value of the primary receiver on the protection border of the primary system 2.

Specifically, the base station 12, according to transmitting power of the mobile relay 13, queries, from available-spectrum information corresponding to the positional regions within the coverage range, at least one positional region less than preset maximum transmitting power, and provides each queried positional region for each mobile relay 13 located within the coverage range.

The mobile relay 13 located within the coverage range is used to, when moving to a positional region determined by the interference position determination memory 14, provide information containing a current positional region for the base station 12, in order to allow the base station 12 to adjust the mobile relay 13 based on the at least one group of available-spectrum information corresponding to the positional region.

Specifically, the mobile relay 13 uses a GPS location tracking technology or other location tracking technologies to monitor its own location, and when determining that it moves to a certain positional region determined by the interference position determination memory 14, sends information containing a current positional region to the base station 12, the base station 12, according to current system time, a carrier frequency at which the base station 12 communicates with other mobile relays 13 and other situations, determines one group of available-spectrum information from the available-spectrum information corresponding to the positional region provided by the mobile relay 13, or re-determines one group of new available-spectrum information, and feeds back the determined available-spectrum information to the mobile relay 13, and the mobile relay 13 communicates with users of the base station 12 and the mobile relay according to the available-spectrum information fed back. Accordingly, the mobile relay 13, when moving to an interference region, rapidly avoids harmful interference to the primary system 2.

For example, the mobile relay M1, each time it moves 50 m, uses the GPS location tracking technology to determine its own location, and when determining that it moves to a certain positional region determined by the interference position determination memory 14, sends information containing a current positional region to the base station 12, the base station 12, according to the received positional region, determines one group of available-spectrum information from the corresponding available-spectrum information, or re-determines one group of new available-spectrum information, and feeds back the determined available-spectrum information to the mobile relay 13, and the mobile relay 13 communicates with users of the base station 12 and the mobile relay according to the available-spectrum information fed back. Accordingly, the mobile relay 13, when moving to an interference region, rapidly avoids harmful interference to the primary system 2.

The operation process of avoiding interference to the system is as follows:

The available-spectrum information provision device 11 acquires operation information of the primary system 2, obtains a protection border of the primary system 2 from the operation information, uses a preset step to divide a region outside the protection border of the primary system 2 into multiple positional regions, and uses a power-distance attenuation formula and the operation information to determine at least one available-spectrum information corresponding to each positional region, the available-spectrum information provision device 11 correspondingly stores the obtained positional regions and the corresponding available-spectrum information in the form of charts, the interference position determination memory 14 installed in the secondary system 15 acquires the charts, determines, based on the available-spectrum information corresponding to different positional regions, at least one of the positional regions of the primary system 2 which is experiencing interference from the mobile relay 13 located within a coverage range, and provides each determined positional region for each mobile relay 13 within the coverage range, each mobile relay 13 uses the GPS location tracking technology to determine its own location, and when determining that it moves to a certain positional region determined by the interference position determination memory 14, sends information containing a current positional region to the base station 12, the base station 12, according to current system time, a carrier frequency at which the base station 12 communicates with other mobile relays 13 and other situations, determines one group of available-spectrum information from the available-spectrum information corresponding to the positional region provided by the mobile relay 13, or re-determines one group of new available-spectrum information, and feeds back the determined available-spectrum information to the mobile relay 13, and the mobile relay 13 communicates with the base station 12 according to the available-spectrum information fed back.

Figure 2:
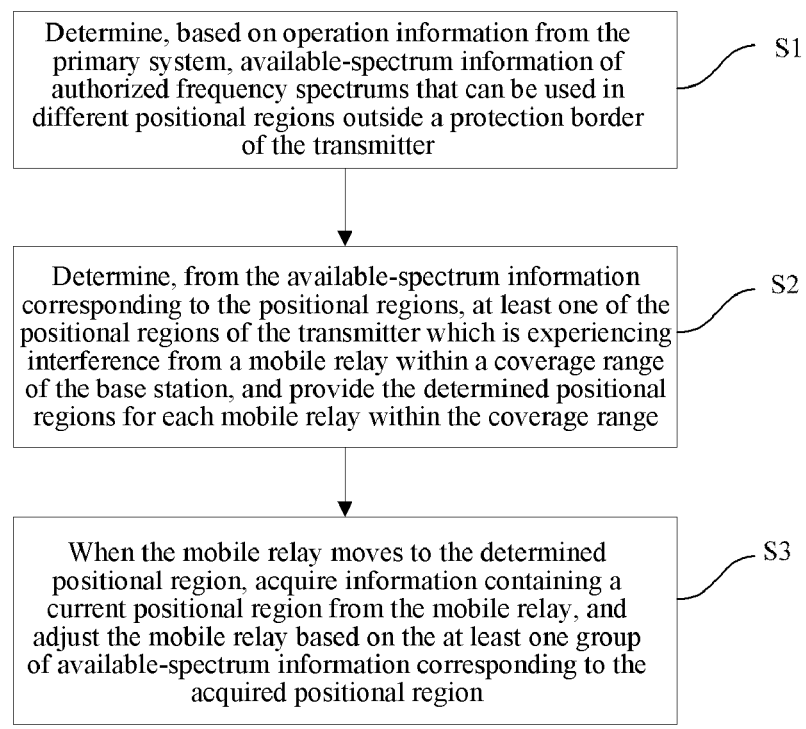
FIG. 2 is a flowchart of a method for avoiding mobile relay interference to a primary system on an authorized frequency spectrum according to the present invention.

As shown in FIG. 2, the present invention further provides a method for avoiding mobile relay interference to a primary system on an authorized frequency spectrum. The method for avoiding interference is mainly performed by an interference avoiding system, and the interference avoiding system includes a secondary system in communication with the primary system, wherein the secondary system includes a base station. Preferably, an available-spectrum information provision device which communicates with the primary system and the secondary system respectively is further included. The base station is at a preset distance from the primary system. Preferably, an edge of a range covered by the base station and a protection border of the primary system are at a safety distance.

In step S1, the interference avoiding system determines, based on operation information from the primary system, available-spectrum information of authorized frequency spectrums that can be used by a mobile relay in different positional regions surrounding the primary system, wherein each positional region corresponds to at least one group of available-spectrum information. The positional region refers to a positional region specified for division. Preferably, different positional regions surrounding the primary system are different positional regions outside the protection border of the primary system. The available-spectrum information includes, but is not limited to, a carrier frequency within an authorized frequency spectrum that can be used by the mobile relay in the positional region, maximum power that the mobile relay in the positional region is allowed to send, an available period during which the mobile relay in the positional region is allowed to use the carrier frequency, a geographic coordinate of the positional region, and so on. The operation information of the primary system includes, but is not limited to, transmitting power of a transmitter in the primary system, antenna height of the transmitter in the primary system, a protection range of the primary system, maximum acceptable interference of a primary receiver on the protection border of the primary system, and so on.

Specifically, the primary system, provides operation information during normal operation, such as carrier frequencies in the authorized frequency spectrum occupied, a period during which the carrier frequencies are occupied, the protection border of the primary system, and power when the primary system is sent to the protection border, for the interference avoiding system, the interference avoiding system uses the operation information provided by the primary system to calculate within which period the mobile relay in each positional region surrounding the primary system can transmit a carrier frequency the same as that of the primary system at how much transmitting power without interfering with ranges within the protection border of the primary system, or which carrier frequency band in the authorized frequency spectrum selected by the mobile relay within the available period will not interfere with ranges within the protection border of the primary system, or which carrier frequency band in the authorized frequency spectrum selected by the mobile relay within the available period and transmitted at how much power will not interfere with ranges within the protection border of the primary system, and so on, and after the calculation, the interference avoiding system can obtain at least one group of available-spectrum information corresponding to each positional region, make the obtained at least one group of available-spectrum information correspond in the corresponding positional region in the form of charts, and store the at least one group of available-spectrum information in a memory.

The standard based on which the mobile relay interferes with the primary system is that: a power value generated by the mobile relay 13 at the protection border of the primary system 2 is greater than a maximum acceptable interference value of the primary receiver on the protection border of the primary system.

It should be noted that persons skilled in the art should understand that step 51 can be performed by a base station in the interference avoiding system, and preferably, step 51 is performed by an available-spectrum information provision device in the interference avoiding system, and available-spectrum information of positional regions obtained is provided for the base station.

Preferably, step S1 further includes steps S11, S12 and S13 (not shown).

In step S11, the interference avoiding system, divides, based on a preset step, a region that takes the primary system as the center into multiple positional regions. The step may be 50 m.

In step S12, the interference avoiding system computes available-spectrum information that can be used by the mobile relay when interference to operation of the primary system is avoided according to a distance from each positional region to the primary system and operation information of the primary system.

In step S13, the interference avoiding system stores the positional regions and the corresponding available-spectrum information correspondingly in the form of charts.

For example, the operation information provided by the primary system includes: a carrier frequency in the authorized frequency spectrum occupied being f1, a period being [a1, b1], the protection border of normal operation of the primary system, etc., the interference avoiding system first divides a region outside the protection border into multiple positional regions according to a preset step, obtains a distance between each positional region and the protection border, uses an attenuation formula of power and distance to compute maximum transmitting power when a power value generated by the mobile relay within a certain positional region c11 at the protection border of the primary system 2 is less than the maximum acceptable interference value of the primary receiver on the protection border of the primary system, and determines according to the operation information available carrier frequencies f2 and f3 in the authorized frequency spectrum and available periods of other available carrier frequencies in the authorized frequency spectrum of other periods include f1, f2 and f3. Next, the interference avoiding system takes the available period [a1, b1], maximum transmitting power, and available carrier frequencies f2 and f3 corresponding to the positional region c11 as one group of available-spectrum information, takes other periods, maximum transmitting power, and available carrier frequencies f1, f2 and f3 corresponding to the positional region c11 as another group of available-spectrum information, and correspondingly stores the two groups of available-spectrum information in the chart of the positional region c11.

In step S2, the interference avoiding system determines, from the available-spectrum information corresponding to different positional regions, at least one of the positional regions of the primary system which is experiencing interference from a mobile relay within a coverage range, and provides the determined positional regions for each mobile relay 13 within the coverage range. A range covered by the base station does not intersect with the protection border. Preferably, an edge of the range covered by the base station and a protection border of the primary system are at a safety distance. The safety distance refers to a distance from an edge of the range covered by the base station to the protection border when a power value generated by the base station at the protection border of the primary system 2 is less than the maximum acceptable interference value of the primary receiver on the protection border of the primary system.

Specifically, the interference avoiding system, according to the maximum transmitting power of the mobile relay, queries, from available-spectrum information corresponding to the positional regions within the coverage range, at least one positional region less than preset maximum transmitting power, and provides each queried positional region for each mobile relay located within the coverage range.

In step S3, when the mobile relay moves to the determined positional region, the interference avoiding system acquires information containing a current positional region from the mobile relay, and adjusts the mobile relay based on the at least one group of available-spectrum information corresponding to the acquired positional region.

Specifically, the mobile relay uses a GPS location tracking technology or other location tracking technologies to monitor its own location, and when determining that it moves to a certain positional region determined by the interference avoiding system, sends information containing a current positional region to the interference avoiding system, the interference avoiding system, according to current system time, a carrier frequency at which the base station in the interference avoiding system communicates with other mobile relays and other situations, determines one group of available-spectrum information from the available-spectrum information corresponding to the positional region provided by the mobile relay, or re-determines one group of new available-spectrum information, the base station feeds back the determined available-spectrum information to the mobile relay, and the mobile relay communicates with users of the base station and the mobile relay according to the available-spectrum information fed back. Accordingly, the mobile relay, when moving to an interference region, rapidly avoids harmful interference to the primary system.

For example, when the mobile relay M1, each time it moves 50 m, uses the GPS location tracking technology to determine its own location, and when determining that it moves to a certain positional region determined by the interference avoiding system, sends information containing a current positional region to the interference avoiding system, the interference avoiding system, according to the received positional region, determines one group of available-spectrum information from the corresponding available-spectrum information, or re-determines one group of new available-spectrum information, the base station feeds back the determined available-spectrum information to the mobile relay 13, and the mobile relay 13 communicates with users of the base station 12 and the mobile relay according to the available-spectrum information fed back. Accordingly, the mobile relay 13, when moving to an interference region, rapidly avoids harmful interference to the primary system 2.

To sum up, the system and method for avoiding mobile relay interference to a primary system on an authorized frequency spectrum according to the present invention, by dividing a region outside the protection border of the primary system into multiple positional regions and determining available-spectrum information of an authorized frequency spectrum used by a mobile relay according to the regions, can control the maximum transmitting power, carrier frequency, available period and the like of the mobile relay in a refined manner, meanwhile, only when the mobile relay moves to an interference region within the range covered by the base station, the mobile relay provides the positional region for the base station, and the base station adjusts the maximum transmitting power, the carrier frequency and the like of the mobile relay to certain available-spectrum information corresponding to the positional region, which can thus effectively reduce the number of times of signaling interaction between the mobile relay and the base station and reduce signaling overhead between the mobile relay and the base station. Therefore, the present invention effectively overcomes various shortcomings in the prior art and has a highly industrial utilization value.

The embodiments of the present invention merely exemplarily describe the principle and effects of the present invention, but are not used to limit the present invention. Any person skilled in the art can make modifications or variations to the embodiments without departing from the spirit and category of the present invention. Therefore, all equivalent medications or variations completed by persons of ordinary skill in the art without departing from the spirit and technical thought disclosed in the present invention should still be covered by the claims of the present invention.

What is claimed is:

1. A system for avoiding mobile relay interference to a primary system on an authorized frequency spectrum, wherein the system comprises:
    an authorized shared access (ASA) controller which communicates with the primary system of the authorized frequency spectrum, used to determine, based on operation information from the primary system, available-spectrum information of the authorized frequency spectrums that can be used in different positional regions surrounding the primary system, wherein each of the positional region corresponds to at least one group of the available-spectrum information; the available-spectrum information comprises: a carrier frequency within an authorized frequency spectrum that can be used by the mobile relay in the positional region, maximum power that the mobile relay in the positional region is allowed to send, and an available period during which the mobile relay in the positional region is allowed to use the carrier frequency; and
    a secondary system which communicates with the ASA controller, comprising:
    a base station; and
    an interference position determination memory, used to determine, based on the available-spectrum information corresponding to different positional regions provided by the ASA controller, at least one of the positional regions of the primary system which is being interfered by a mobile relay located within a coverage range of the base station, so that the base station could provide the determined positional regions for each mobile relay within the coverage range; and
    the mobile relay located within the coverage range of the base station, used to, when moving into the positional region, provide to the base station information containing the positional region where the mobile relay is located, so that the base station could adjust the mobile relay based on the at least one group of available-spectrum information corresponding to the positional region;
    wherein the base station adjusts the mobile relay by adjusting its maximum power corresponding to the positional region of the mobile relay; when the mobile relay transmits with the maximum power, a power value generated by the mobile relay is less than a maximum acceptable interference value on the protection border of the primary system.

2. The system for avoiding mobile relay interference to a primary system on an authorized frequency spectrum according to claim 1, wherein the ASA controller comprises:
    a processor, used to divide, based on a preset step, a region that takes the primary system as the center into multiple positional regions, and compute available-spectrum information used when interference to operation of the primary system is avoided according to a distance from each positional region to the primary system and operation information of the primary system; and
    a storage, used to store the positional regions and the corresponding available-spectrum information correspondingly in the form of charts.

3. The system for avoiding mobile relay interference to a primary system on an authorized frequency spectrum according to claim 1, wherein the base station is further used to, according to current system time and a carrier frequency at which the base station communicates with another mobile relay, determine one group of available-spectrum information or re-determine one group of new available-spectrum information from the available-spectrum information corresponding to the positional regions provided by the mobile relay, and feed back the determined available-spectrum information to the mobile relay, and the mobile relay communicates with users of the base station and the mobile relay according to the available-spectrum information fed back.

4. The system for avoiding mobile relay interference to a primary system on an authorized frequency spectrum according to claim 1, wherein an edge of a range covered by the base station and a protection border of the primary system are at a safety distance.

5. A method for avoiding mobile relay interference to a primary system on an authorized frequency spectrum, applied to an interference avoiding system comprising a base station at a preset distance from the primary system on the authorized frequency spectrum, wherein the method comprises:
    a step for determining, based on operation information from the primary system, available-spectrum information authorized frequency spectrums that can be used in different positional regions surrounding the primary system, wherein each positional region corresponds to at least one group of available-spectrum information; the available-spectrum information comprises: a carrier frequency within an authorized frequency spectrum that can be used by the mobile relay in the positional region, maximum power that the mobile relay in the positional region is allowed to send, and an available period during which the mobile relay in the positional region is allowed to use the carrier frequency;
    a step for determining, from the available-spectrum information corresponding to different positional regions, at least one of the positional regions of the primary system which is experiencing interference from a mobile relay located within a coverage range of the base station, and providing the determined positional regions for each mobile relay within the coverage range; and a step for acquiring information containing positional region from the mobile relay, when the mobile relay moves to the determined positional region, and then adjusting the mobile relay based on the acquired at least one group of available-spectrum information corresponding to the positional region;

wherein the mobile relay is adjusted by its maximum power corresponding to the positional region of the mobile relay; when the mobile relay transmits with the maximum power, a power value generated by the mobile relay is less than a maximum acceptable interference value on the protection border of the primary system.

6. The method for avoiding mobile relay interference to a primary system on an authorized frequency spectrum according to claim 5, wherein the available-spectrum information comprises:

a carrier frequency within an authorized frequency spectrum that can be used by the mobile relay in the positional region, maximum power that the mobile relay in the positional region is allowed to transmit, and an available period during which the mobile relay in the positional region is allowed to use the carrier frequency.

7. The method for avoiding mobile relay interference to a primary system on an authorized frequency spectrum according to claim 6, wherein in the anti-interference method, the manner of determining, based on operation information from the primary system, available-spectrum information authorized frequency spectrums that can be used in different positional regions surrounding the primary system comprises:

dividing, based on a preset step, a region that takes the primary system as the center into multiple positional regions;

computing available-spectrum information that can be used by the mobile relay when interference to operation of the primary system is avoided according to a distance from each positional region to the primary system and operation information of the primary system; and storing the positional regions and the corresponding available-spectrum information correspondingly in the form of charts.

8. The method for avoiding mobile relay interference to a primary system on an authorized frequency spectrum according to claim 5, wherein, in the interference avoiding method, the manner of adjusting the mobile relay based on the acquired at least one group of available-spectrum information corresponding to the positional region comprises:

according to current system time and a carrier frequency at which the base station communicates with another mobile relay, determining one group of available-spectrum information or re-determining one group of new available-spectrum information from the available-spectrum information corresponding to a positional region provided by the mobile relay, and feeding back the determined available-spectrum information to the mobile relay, wherein the mobile relay communicates with users of the base station and the mobile relay according to the available-spectrum information fed back.

9. A device for avoiding mobile relay interference to a primary system on an authorized frequency spectrum, wherein the device comprises:

a processor, used to divide a region around the primary system into multiple positional regions, and compute available-spectrum information respectively corresponding to the positional region, according to a distance from each of the positional region to the primary system, wherein the available-spectrum information could be used for the mobile relay's adjustment; the available-spectrum information comprises: a carrier frequency within an authorized frequency spectrum that can be used by the mobile relay in the positional region, maximum power that the mobile relay in the positional region is allowed to send, and an available period during which the mobile relay in the positional region is allowed to use the carrier frequency; and a storage, used to store the positional regions and the available-spectrum information corresponding to the positional regions;

wherein the available-spectrum information is used to adjust the mobile relay's maximum power corresponding to the positional region of the mobile relay; when the mobile relay transmits with the maximum power, a power value generated by the mobile relay is less than a maximum acceptable interference value on the protection border of the primary system.

10. The device for avoiding mobile relay interference to a primary system on an authorized frequency spectrum according to claim 9, wherein the available-spectrum information corresponding to the positional regions includes a carrier frequency within the authorized frequency spectrum that can be used in the positional region.

11. The device for avoiding mobile relay interference to a primary system on an authorized frequency spectrum according to claim 10, wherein the available-spectrum information corresponding to the positional regions includes an available period during which the mobile relay in the positional region is allowed to use the carrier frequency.

12. The device for avoiding mobile relay interference to a primary system on an authorized frequency spectrum according to claim 9, wherein the available-spectrum information corresponding to the positional regions includes maximum transmitting power that the mobile relay in the positional region is allowed.

13. The device for avoiding mobile relay interference to a primary system on an authorized frequency spectrum according to claim 9, wherein a power value generated by the mobile relay at a protection border of the primary system, is less than maximum acceptable interference value of a primary receiver on the protection border of the primary system.

* * * * *